United States Patent [19]
Maritzen et al.

[11] Patent Number: 5,987,429
[45] Date of Patent: Nov. 16, 1999

[54] COMPUTER-BASED FEE PROCESSING FOR ELECTRONIC COMMERCE

[75] Inventors: Lynn Michael Maritzen, Fremont; Carl Alexander Wescott, Mill Valley, both of Calif.

[73] Assignee: Sun Microsystems, Inc., Palo Alto, Calif.

[21] Appl. No.: 08/991,043

[22] Filed: Dec. 16, 1997

[51] Int. Cl.$^6$ ........................................ G06F 17/60
[52] U.S. Cl. .............................. 705/31; 705/30; 705/400; 707/104
[58] Field of Search ................................. 703/1, 30, 31, 703/34, 400; 707/100, 104

[56] References Cited

U.S. PATENT DOCUMENTS

| | | | |
|---|---|---|---|
| 5,819,249 | 10/1998 | Dohanich et al. | 705/46 |
| 5,852,819 | 12/1998 | Reeder | 705/39 |

*Primary Examiner*—Edward R. Cosimano
*Attorney, Agent, or Firm*—Homer L. Knearl; William J. Kubida; Holland & Hart LLP

[57] ABSTRACT

Fees due from transactions in electronic commerce are processed by building a transaction information database with transaction event objects based on events in each transaction. After retrieving fee rules from a fee rule database, a determining step detects if the fee rule applies to information in a transaction event object. Then, if the fee rule applies, a calculating step calculates the fee based on the fee rule and the information in the transaction event object. A fee object for a recipient entity is created based on the fee calculated by said calculating step and is stored in a payment database. An accumulating step sums the payments for a recipient entity from the fee objects in the payment database. The fee rules are general fee rules and specific fee rules. The general fee rules are applied to information in a transaction event object, and a calculating step calculates a general fee based on the general fee rule and the information in the transaction event object. Thereafter, the specific fee rules are applied to information in a transaction event object, and the calculating step calculates a specific fee based on the specific fee rule and the information in the transaction event object.

23 Claims, 7 Drawing Sheets

PURCHASE OBJECT
    BUYER: JOHN SMITH
    ADDRESS: 123 MAIN STREET
                    ANYTOWN, AB USA
    PHONE: (222) 555-5555
    PRICE: $123.45
    CREDIT: VISA
        NUM: 1234 4567 8900 1234
        EXP: 09/99

PRODUCT/SERVICE OBJECT
    TYPE: PRODUCT
    NAME: SMASHER
    DESCRIP: TENNIS RACKET
    ORIGIN: WINN ATHELIC CO, UK
    MATERIAL: TITANIUM
    CATEGORY: SPORTING GOODS

ENTITIES OBJECT
    BUYER: NAME, LOCATION
    SELLER: NAME, LOCATION
    DIST'R: NAME, LOCATION
    WAREH'SE: NAME, LOCATION
    SHIPPER: NAME, LOCATION

SHIPPING/DELIVERY OBJECT
    METHOD: GROUND/AIR/SEA
    SHIPPER1: NAME, LOCATION
    SHIPPER2: NAME, LOCATION
    TRANSIT: LOCATION1, LOCATION2

ORDER COMMUNICATION OBJECT
    METHOD: INTERNET/CABLE/TELEPHONE
    SERV. PRDR: NAME, LOCATION
    SUBSCRBR: NAME, LOCATION

*FIG. 3*

COMPUTER-BASED FEE PROCESSING FOR ELECTRONIC COMMERCE

BACKGROUND OF THE INVENTION

1. Field of The Invention

This invention relates to a method and apparatus for automatically tracking, calculating and electronically paying taxes, royalties and other fees associated with transactions in electronic commerce systems. More particularly, the invention relates to tracking electronic transactions through multiple phases of the transaction occurring in multiple transaction locations, computing the correct taxes and fees and paying those taxes and fees to the appropriate recipient.

2. Description of the Problem

The Internet, particularly the World Wide Web, has provide an opportunity for a dramatic expansion of electronic commerce. Goods are shopped for, purchased, paid for and in some cases delivered over the Web. Such transactions usually have multiple phases such as shopping, purchase, warehousing, shipping and delivery. Further, each of these phases from shopping to delivery of the goods typically occurs in different contractual fee or tax fee jurisdictions.

Thus, one problem in electronic commerce is tracking the phases or events of the transaction occurring in each location or jurisdiction where that event carries tax or a contractual fee. For example, a customer participating in a given electronic transaction is in Portland, Oreg. The customer uses an Internet Service Provider (ISP) in San Jose, Calif., to dial into a seller's web site located in Boston, Mass. The customer purchases a product from a seller whose actual location is in New York City. The product is shipped from the seller's warehouse in New Jersey to the customer in Portland, Oreg. The seller must now track all events in this transaction carrying a tax fee or a contractual fee, compute the tax or other fee for the transaction, collect from the customer and pay the tax or other fee to the correct recipient.

Another problem in electronic commerce illustrated in the above example is that the transaction event in a given jurisdiction may or may not be taxable. The tax laws in many jurisdictions relating to electronic commerce are changing rapidly. In some jurisdictions, the laws have been updated and are clearly specified as to their impact on electronic commerce. In other jurisdictions, the laws are often unclear or untested as to their relevance to electronic commerce. Further, the tax laws in a given jurisdiction sometimes have specific provisions related to specific types of goods. Accordingly, a business wishing to market goods on the web has a labyrinth of laws to analyze when update its processes for paying taxes. Further, multiple events in the transaction must be tracked, and evaluated for tax if any in multiple jurisdictions. Tax records must be kept and taxes must be paid for the correct event in the appropriated jurisdiction.

SUMMARY OF THE INVENTION

In accordance with this invention, the above problems with the prior art have been solved by automatically processing in a computing system fees due from transactions in electronic commerce. In a method implementation of the invention, the processing begins by building a transaction information database with transaction event objects based on events in each transaction. After retrieving fee rules from a fee rule database, a determining step detects if the fee rule applies to information in a transaction event object. Then, if the fee rule applies, a calculating step calculates the fee based on the fee rule and the information in the transaction event object. A fee object for a recipient entity is created based on the fee calculated by said calculating step and is stored in a payment database. An accumulating step sums the payments for a recipient entity from the fee objects in the payment database.

As another feature of the invention, the determining step starts by getting the location of an event from the transaction event object. It then applies the jurisdiction of the fee rule against the location of the transaction event object, and a calculating step calculates the fee if the jurisdiction matches the location. The determining step in another feature of the invention retrieves fee rule conditions in addition to jurisdiction. A testing step tests the fee rule conditions against information in the transaction event object to decide if the fee rule applies. The calculating step calculates the fee if both the jurisdiction and the fee rule conditions apply to the transaction event object.

As another feature of the invention, a second determining step detects if a fee, that is applicable to a transaction event object, has already been calculated when processing a previous transaction event object in the same transaction. This step is performed in order to not duplicate fees for the same transaction.

As another feature of the invention, the fee rules are general fee rules and specific fee rules and the method implementation of the general fee rules applies to information in a transaction event object, and the calculating step calculates a general fee based on the general fee rule and the information in the transaction event object. Then, a second applying step applies the specific fee rules to information in a transaction event object, and the calculating step calculates a specific fee based on the specific fee rule and the information in the transaction event object.

The above computer implemented steps in another implementation of the invention are provided as an article of manufacture; i.e., a computer program being storage medium readable and containing a computer process for performing the above described steps.

In a machine implementation of the invention, apparatus for processing fees due in multiple phases of a transaction in electronic commerce in a computing system has a plurality of modules. A collecting module builds a transaction information database from transaction information by creating transaction phase objects containing transaction information about phases of the transaction. The transaction phase objects are transaction information data objects about multiple phases of the transaction including a purchasing phase, an order-communication phase, and a delivery phase. A calculation module applies fee rules from a rule database to the transaction phase objects, computes fees due at each phase of the transaction, and creates fee objects containing fee payment information based on the phases of the transaction and identifying the fee recipient entity. A payment module retrieves fee objects and makes payments to fee recipient entities identified in the fee objects.

As another feature of the invention, the rule database is a tax rule database and the calculation module has a plurality of modules. A jurisdiction module determines from a transaction phase object if a phase of the transaction occurs in the jurisdiction of a tax rule from the tax rule database. A tax module applies the tax rule to the phase of the transaction to compute a tax fee due and create a tax fee object that includes the tax fee due and the identity of a payee for the jurisdiction.

As another feature of the invention, a special tax module applies a specific tax rule to the phase of the transaction to compute a specific tax fee due based on information in the transaction phase object and creates a specific tax fee object that includes the specific tax fee due and the identity of a payee.

In another feature of invention, the payment module has a total module for accumulating all tax fees due to a payee and a disbursement module for determining the optimum method of payment and for executing payment to the payee.

One practical application of the invention is the automatic tracking, calculating and payment of taxes and other fees that become due as the result of conducting business transactions on the Internet or World Wide Web. Further, as other commercial communication networks are developed, the invention may be applied as well to transactions on those networks. The foregoing and other features, advantages and applications of the invention will be apparent from the following more particular description of a preferred embodiment of the invention as illustrated in the accompany drawings.

BRIEF DESCRIPTION OF DRAWINGS

FIG. 3 illustrates the contents of the transaction information objects in the preferred embodiment of the invention.

DETAILED DESCRIPTION OF THE PREFERRED EMBODIMENTS

The embodiments of the invention described herein are implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making the embodiments of the invention described herein are referred to variously as operations, steps or modules.

Figure 1:
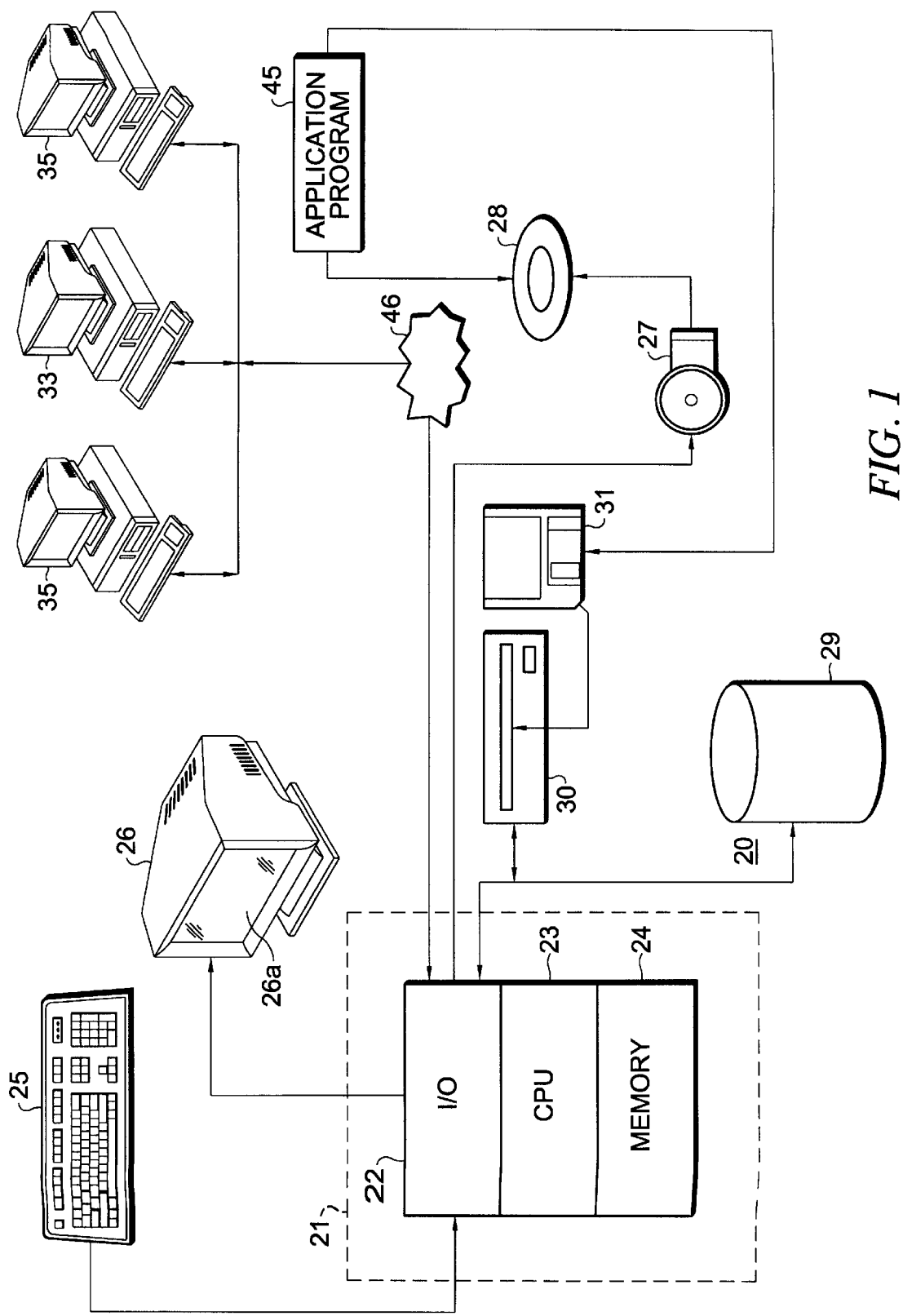
FIG. 1 illustrates a computing system acting as a client server in a communication network, such as Internet, to perform the logical operations of the invention.

In FIG. 1, a server located at the network service provider is illustrated along with the clients communicating with the server through the network. The server includes processor 21, keyboard 25, display 26, disk storage unit 29, optical disk drive unit 27 and floppy disk drive unit 30. The clients using web browser programs are at client stations 33 and 35 and are connected to the server through network 46. Processor 21 includes an input/output section 22, a central processing unit 23, and a memory section 24. The input/output section 22 is connected to keyboard 25, a display or monitor 26 and a disk storage unit 29 as well as an optical disk drive unit 27 for reading a CD-ROM 28 and a floppy disk drive unit 30 for reading a diskette 31. Application programs 45 may be loaded into the computing system 20 from either the CD-ROM 28 or diskette 31 or from other stations connected to the network. The network may by internet or extranet. The network might also be a cable network in which case the server would be at the cable service provider and the client station at the cable service subscriber. The network might also be a telephone company network with the server at the telephone company and the client at the telephone subscriber. In whatever manner the communication network is configured, the input/output unit 22 includes a communications adapter for communicating on the network 46 to the remote client stations containing the browser. Examples of computing systems that may be used as either a client server 20 or a client 35 include the SPARC systems offered by Sun Microsystems, Incorporated, personal computers offered by IBM Corporation and by other manufacturers of IBM compatible personal computers, and other computer systems running the UNIX, OS/2, AIX, DOS, etc. operating systems.

Figure 2A:
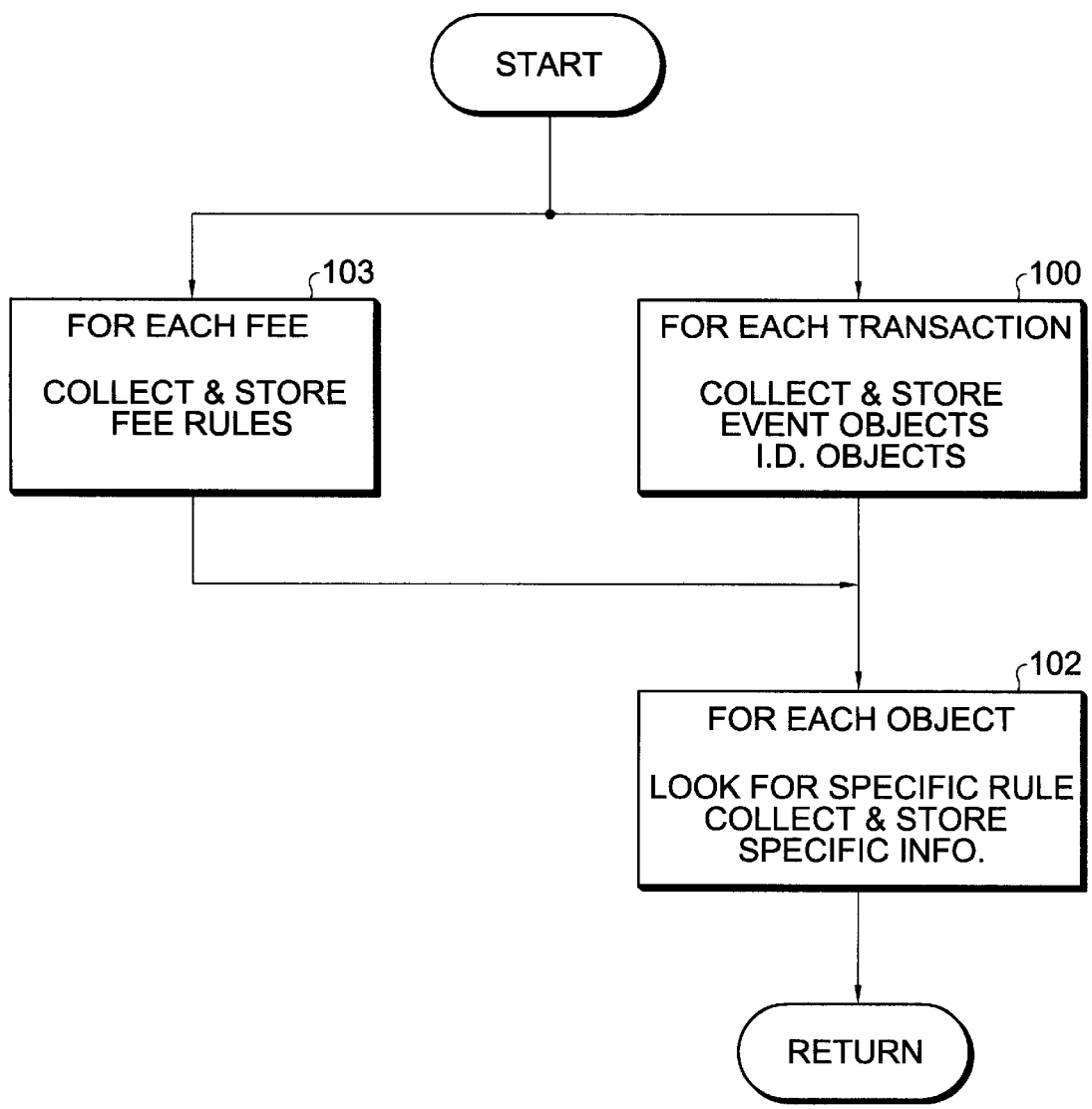
FIG. 2A shows the logical operations in a preferred embodiment of the invention to collect and store fee rule information and transaction information.
Figure 2B:
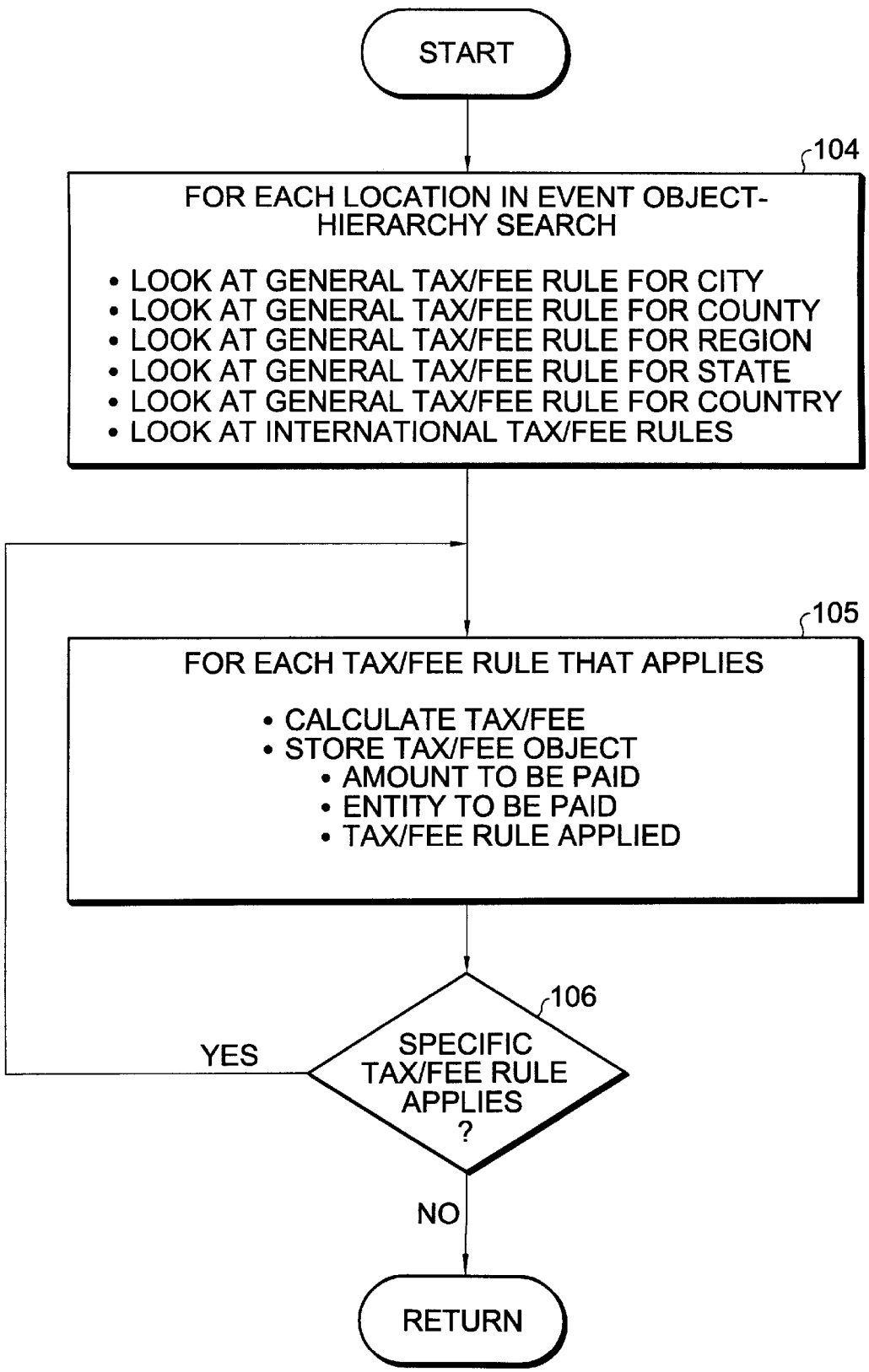
FIG. 2B shows the logical operations in a preferred embodiment of the invention to apply the tax fee rules and other fee rules to the transaction and calculate the tax/fee payments due from the transaction.
Figure 2C:
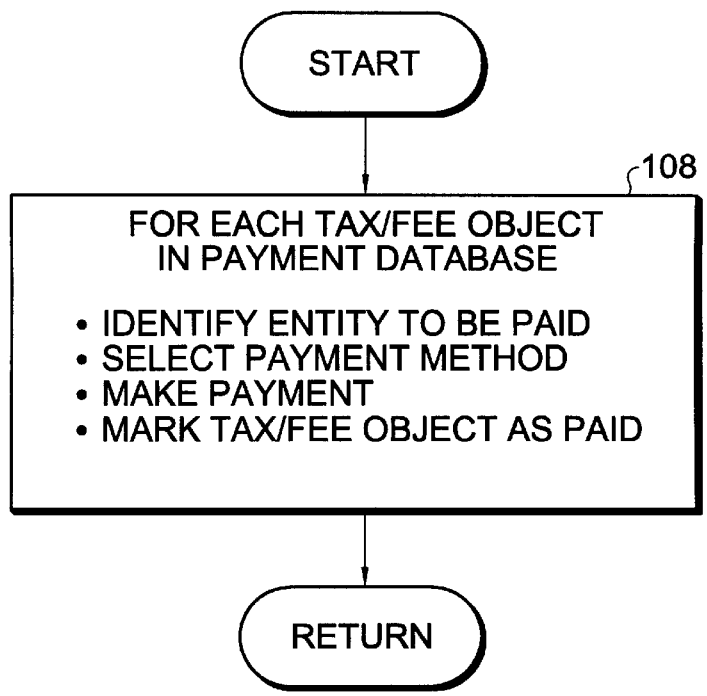
FIG. 2C shows the logical operations in a preferred embodiment of the invention to make the tax/fee payments due from the transaction.

In FIGS. 2A, 2B and 2C, logical operations or modules to perform the preferred embodiment of the invention at the server are shown. The transaction information collection operation is in FIG. 2A. The tax or fee calculation operation is in FIG. 2B, and the tax or fee payment operation is in FIG. 2C.

In FIG. 2A, the collection of information is performed as two operations. Operation 100 is a general information collection operation which refers to collecting information to which fees apply in general as for example a sales tax or contractual fee on all goods sold within the jurisdiction. Contractual fees might be use fees, royalties, superdistribution fees or any other fee agreed to by the parties in the electronic transaction.

Superdistribution refers to distribution of digital information, including data and software, which is made available under modes of usage authorized by its copyright holder. Such distribution of software or content is made with an electronic shrinkwrap agreement which specifies the usage and fees associated with software or content. For example, customer A may download the software/audio/video/text/hypertext, and may, if permitted, freely distribute it to customer B. However, customer B might only be permitted to use it for a prescribed interval of time or for a predetermined number of tries or accesses before having to buy it. Usually an engine downloaded with the software or content communicates with a back-end, letting it know where all 'seeded' copies of the software or content end up. At the same time this engine may collect customer/demographic information.

As discussed above operation 100 collects the general transaction information. Operation 102 is an information collection operation for a specific transaction and tax/fee combination as, for example, a tariff on a specific type of goods, such as supercomputers from Japan, or royalties on a specific product, such as a patent license fee for a specific, computer-program product. Operations 100 and 102 gather or retrieve transaction information, build transaction information objects and store the transaction information objects in a transaction information database for subsequent use by fee calculation operations in FIG. 2B.

For each transaction object processed in operation 100, operation 102 tests for a specific tax law or contractual fee applicable only to that specific transaction object. Operation 102 collects and stores tax fee rule information and other fee rule information. This information is stored in the form of tax rule objects and other fee rule objects. If operation 102 detects an applicable specific tax fee rule or specific other fee rule, then additional transaction information objects about the transaction may be required. If so, that specific transaction information is retrieved, a specific transaction information object is built and stored in the transaction database for processing by the fee calculating operations in FIG. 2B.

Operation 100 is retrieving transaction information analyzing the transaction information and organizing the transaction information into phases or events of the transaction. These phases or events are preferably, the purchase phase, the delivery phase and the order-communication phase. The transaction information objects are preferably one of these three types of phases or these events. There may be multiple transaction information objects for a given phase or event in the transaction. Preferred embodiments of the transaction information objects are shown in FIG. 3.

In FIG. 3, purchase transaction information object identifies the buyer (i.e., the purchaser or customer), the buyer's location, the purchase amount and the method of payment, such as credit/debit card information. Of course, other methods of payment including a buyer's account with the seller or electronic transfer of funds could be arranged and used in the electronic transaction. Also, payment might be in a form other than money. Goods, services and information might be tendered as payment. Such forms of payment are tracked in the same manner as monetary forms of payment.

Other transaction information objects shown in FIG. 3 are purchased product or service object, transaction entities object, shipping/delivery object, and order-communication object. The product/service information identifies the type—product, service, or other such as electronic data or information. The product/service information object also includes such information as brand name, description, origin (manufacturer or service provider), category, material, etc.—for example, brand name: Smasher; description: tennis racket model #12345; origin: Winn Athletic Co., United Kingdom; category: sporting goods; material: titanium. The transaction entities information object includes the name and location of the buyer (purchaser), seller, distributor (if any), warehouse company, shipper(s), etc. The shipping/delivery information object includes method of shipment, name of one or more shippers, transit locations of shipment. The order-communication information object includes information on how the order was placed and through what communication service provider the order was place. The order might be placed through an internet or extranet, through a telephone modem or through a cable modem, and the service provider would be an internet service provider, a telephone company or a cable company, respectively. The communication information would include the name and location of the communication service provider.

Figure 4:
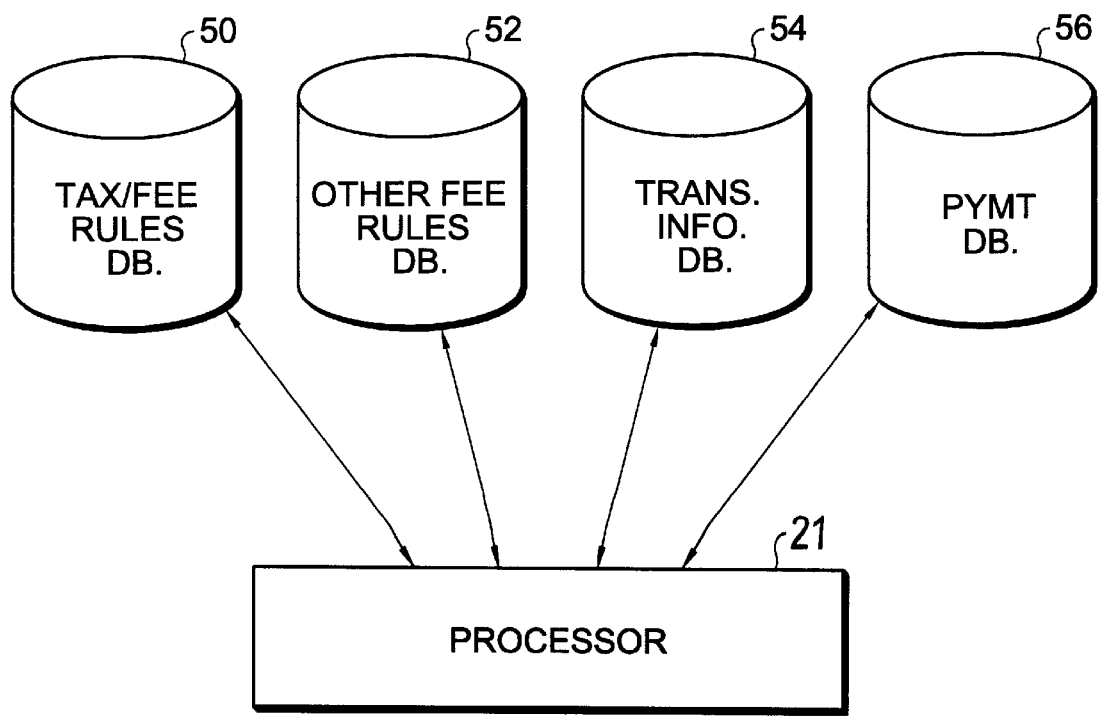
FIG. 4 shows the databases used in the preferred embodiment of the invention.

The databases used in the preferred embodiment of the invention are illustrated in FIG. 4. The databases are managed by processor 21 (FIG. 1) and may be stored in a storage system connected through the input/output section 22 of processor 21. There are four databases in the preferred embodiment. A tax fee rules database 50 contains the tax rules to be applied to the transaction objects. An other fee rules database 52 contains the fee rules other than tax rules to be applied to the transaction objects. These fee rules would likely be contractual fee rules based on conditions in agreements or contracts. An example is a royalty fee rule based on a license agreement. The transaction information objects of FIG. 3 are stored in a transactions information database 54. The payments for applied tax rules or other fee rules are stored as tax/fee objects in payment database 56.

Returning to FIG. 2A, operation 103 is performed in parallel or off-line to operations 100 and 102. In operation 103 tax fee and other fee information is collected and stored in the tax rule and the other fee rule databases. The tax rule database is created and updated in response to the seller notifying the server of tax laws and tax law changes. Alternatively, the service provider for the seller could be monitoring the tax laws and maintaining the tax rule database. The fee database includes rules for fees charged against transactions where the fees are peculiar to the seller. These might include license royalty fees or other contractual fees due to a third party when the seller sells specific goods or services. These fees may be general or location dependent as in the case of a patent license fee based on a United States and/or foreign patent due when a product is sold in the United States or when a product is sold in the foreign country. The seller could create and update the fee rule database and download it to the service provider. Alternatively, the seller could notify the service provider of the fee rules and fee rule changes, and the service provider would maintain the fee rule database.

With the above transaction information database, the tax rule database and fee rule database available, the server can now use the tax/fee calculation operation in FIG. 2B to compute all taxes and fees associated with the transaction. The calculation can be performed in real time during the processing of a transaction or can be performed subsequently in batch mode when multiple transactions are processed. Logical operations in FIG. 2B apply rules and compute the general taxes or fees on the transaction event objects of the transaction. In one preferred embodiment of the invention, operation 104 searches through a hierarchy of tax rules and other fee rules entered into a tax rule database and an other fee rule database based on location, i.e. jurisdiction, of each phase or event of the transaction. The hierarchy of tax rules proceeds by jurisdiction successively through city, county, region, state, country, global. The other fee rules would generally have a less complicated hierarchy. In most cases, license fees will be territorial and will have a hierarchy which is specified by region and country. Contractual fees might also be organized by specific product or service in a predetermined region or country.

Operation 105 applies the rules provided by operation 104 against the transaction event object. If a rule applies, operation 105 calculates the tax or other fee according to the rule. A tax/fee object is created that contains the amount to be paid, the entity to be paid and the tax/fee rule applied by operation 105. The operation then stores this information as a tax/fee object in a payment database.

In an example of tax rules, if the buyer is in the city of Boulder, Colo., then for the taxable event of purchaser or buyer located in Boulder, the computation operation 104 would work through, as applicable, City of Boulder taxes, Boulder County taxes, regional taxes for the Denver metropolitan area, State of Colorado taxes, Federal taxes for the United States of America and taxes or duties for other countries. The tax fee rules for all locations in the phases of the transaction as stored in the transaction information objects would be checked. As each taxable event is tested against various jurisdictions, the tax to be paid is computed, the entity carrying the tax liability is identified, and the applicable tax law is identified. The general tax information object for the taxable event is then stored in a tax payments database.

Once the general tax fee rules are tested for all locations of a transaction, the specific tax fee rules are checked by operation 106. If detecting operation 106 detects that a specific tax fee or specific other fee rule applies, the operation flow branches YES and returns to operation 105. Operation 105 then computes specific tax fees or specific other fees for each transaction object. Operation 106 is testing the taxable event against temporary or specific tax fee rules in the jurisdiction where the fee event is located. For example, in the earlier transaction involving a titanium tennis racket, assume there is a tax law in Oregon saying all titanium sporting good items sold or delivered in the state carry a 5% luxury tax. If there is tax liability identified, the tax to be paid is computed, the entity carrying the tax liability is identified, and the applicable tax law is identified. The specific tax information object for the taxable event is then stored in a fee payments database.

In FIG. 2C, the fee payment operation 108 works on the general tax/fee objects and specific tax/fee objects stored in the payments database. In the case of taxes, operation 108 reads the government entity to be paid and the amount of the payment. In the case of fees, operation 108 reads the recipient to be paid and the amount of the payment. Multiple payments to the same entity are accumulated. Each payment is identified with a transaction, with the tax liable entity and any other information from the transaction that may be required by the tax law or the other fee conditions. Operation 108 checks for the method of payment; i.e., check, electronic transfer, etc. The payment is then made by operation 108 and the tax objects paid are marked paid in the payment database.

Figure 5:
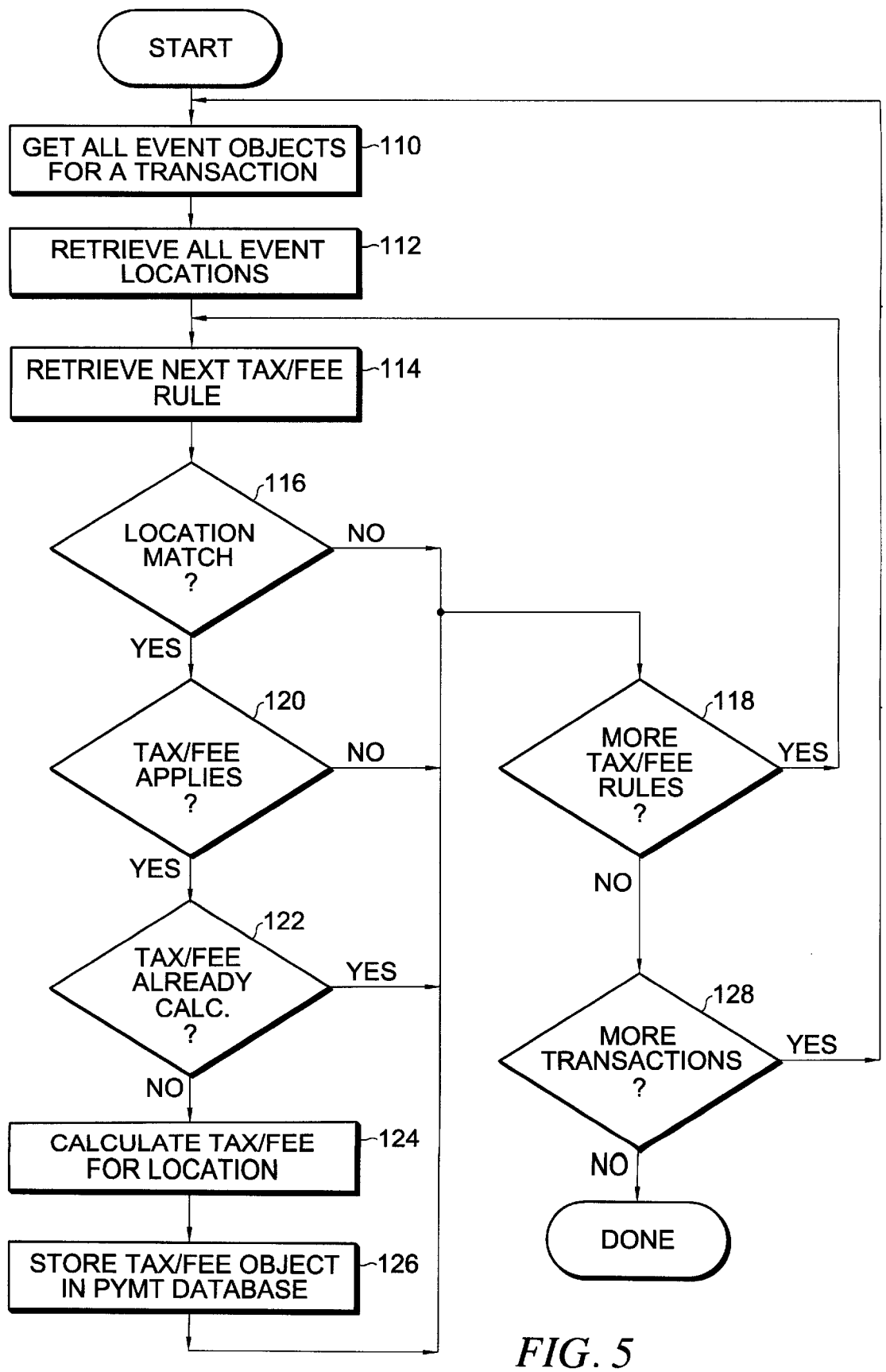
FIG. 5 shows the logical operations, in another preferred embodiment of the invention, for applying tax fee rules and other fee rules to the transaction and computing the tax fees and other fees.

In another preferred embodiment of the invention, the tax/fee calculation operations of FIG. 2B could be replaced by the operations shown in FIG. 5. In this embodiment, module 110 gets all event or phase transaction information objects for a transaction from the transaction database. From these event objects, module 112 retrieves all the locations where an event occurred for the transaction. These locations would be purchase related locations, delivery related locations, order-communication related locations. Retrieve module 114 retrieves the next tax fee or other fee rule from the tax fee rule database and fee rule database. Jurisdiction decision module 116 compares the applicable jurisdiction of the rule to the location for each event in the transaction. If there is no match, the operation flow branches to decision operation 118. Decision operation 118 tests for more rules. If there are more tax fee or other fee rules to be processed, the operation flow returns to module 114 to get the next tax fee or other fee rule.

If there is a location match detected by jurisdiction decision operation 116, the operation flow branches to decision operation 120. Decision operation 120 detects whether additional conditions besides jurisdiction in the tax fee or other fee rule apply. For example, there may be a sales tax rule that applies to the location but the rule might exempt the product or service which is the subject of the transaction. In such a case, decision operation 120 would retrieve the purchased product object from the database and compare the type of goods or services to the taxable goods or services specified in the rule. If the tax fee or other fee rule conditions do not apply, the operation flow returns to decision operation 118 to test for more rules to be processed.

If the rule does apply, the operation flow branches YES from decision module 120 to decision module 122. Decision module 122 is testing to determine if the tax, just determined to be applicable by module 120, might already have been calculated for the transaction. For example, if a sales tax had already been calculated for the sales event, the same tax should not be calculated as a delivery event. If the tax or fee has been already calculated, the operation flow branches YES to return to decision operation 118 to test for more rules.

If the tax or fee has not been previously calculated, the operation flow branches NO to module 124 to perform the tax fee or other fee calculation. Module 124 gets the appropriate fixed fee or a rate from the rule, applies the fixed fee to the event or calculates the tax fee or other fee by multiply the rate times the purchase price or other appropriate charge in the transaction. Other appropriate charges, to which a tax or fee rule might apply, are shipping charges, communication charges, service charges or other charges associated with the electronic commerce process. After the tax or fee is calculated, module 126 builds the tax fee or other fee object and stores it in the payment database. The tax fee or other fee objects in the payment database are processed by the payment process in FIG. 2C. The operation flow in FIG. 5 returns from step or module 126 to decision operation 118.

After all the tax fee rules and other fee rules have been checked against event locations, the operation flow branches NO from decision operation 118 to decision operation 128. Decision operation 128 then detects whether more transactions need to be processed for tax fee or other fee calculations. If the answer is YES, the operation flow returns to module 110 to get the event objects for the next transaction. If the answer is NO, the tax/fee calculation logical operations are completed.

Figure 6:
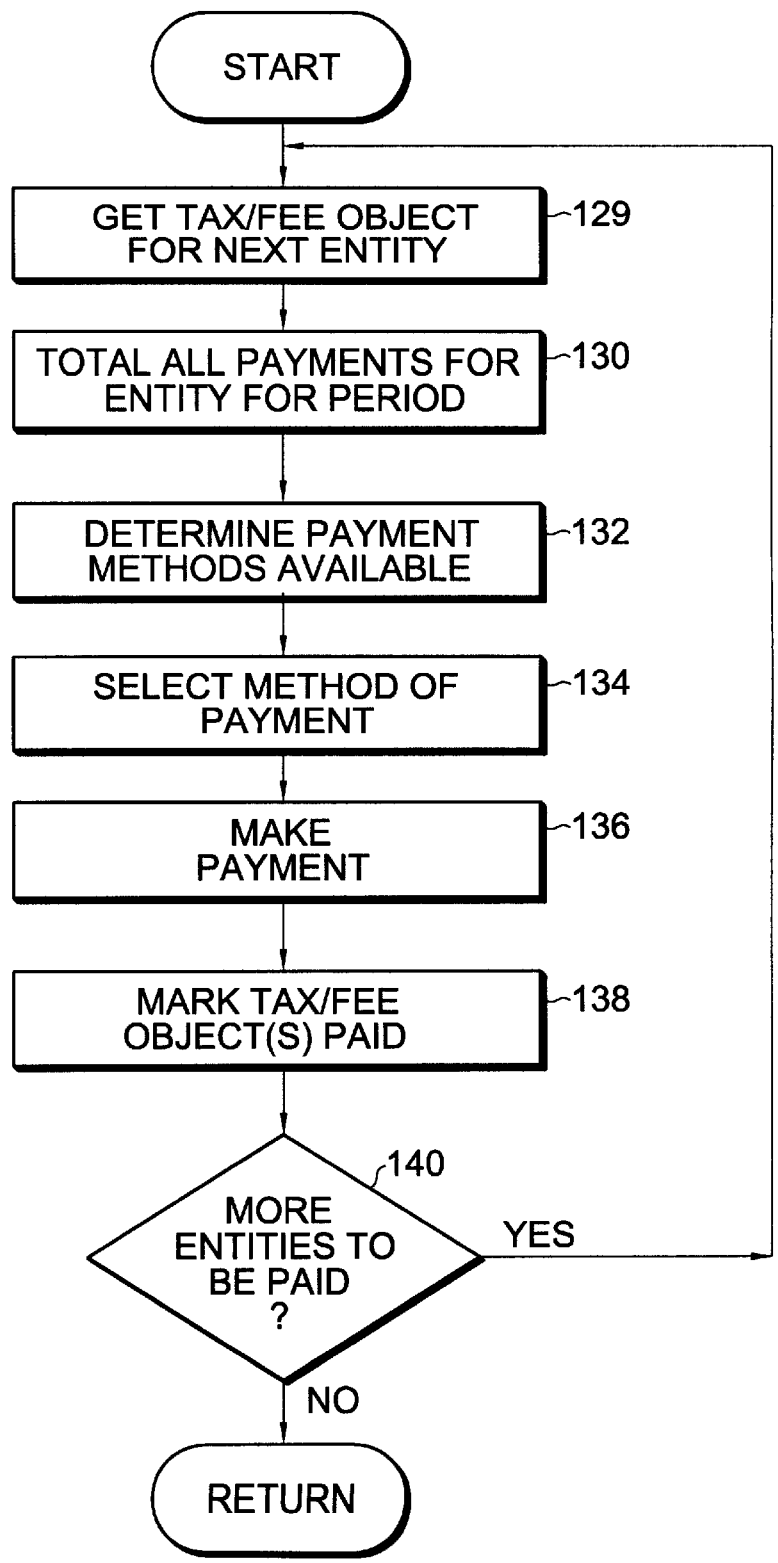
FIG. 6 shows the logical operations, in another preferred embodiment of the invention, for paying the tax fees and other fees.

In another preferred embodiment of the invention, the tax/fee payment operation 108 of FIG. 2C is replaced by the logical operations in FIG. 6. Operation 129 gets tax/fee objects to be paid for the next recipient entity having unpaid tax/fee objects in the payment database. Operation 130 totals all payments for this recipient entity for a given time period. The period might be daily, weekly, monthly, etc. Operation 132 determines the methods of payment available for the recipient entity. Operation 134 chooses the most appropriate method of payment, and operation 136 makes the payment. To make the choice, operation 134 reviews the payment methods available, such as check, electronic transfer, tax/fee credit offset, etc. Operation 134 then selects the fastest and most efficient method of payment.

After the payment is made, operation 138 marks the tax fee or other fee objects, that have been paid, as paid in the payment database. Decision operation 140 tests for more payments to other recipient entities. If there are other recipient entities to be paid, the operation flow branches YES to operation 129. Operation 129 gets tax/fee objects for the next recipient entity and operation 130 again totals the payments for that entity. If there are no more recipient entities to be paid, the logical operations for paying the taxes and fees are complete.

Besides the tax/fee calculation operations discussed in FIG. 2B and FIG. 5, and the payment operations describe in FIG. 2C and FIG. 6, other variations might be implemented. For example, the tax fee and other fee rules might be sorted by jurisdiction and then all transaction objects for a given jurisdiction could be retrieved and processed. In the case of contractual fee, all products or services subject to the contractual fee might be sorted and the fee rule applied. Many other variations for making use of the transaction information objects to track, calculate and pay taxes and fees are apparent from the above embodiments described and suggested.

While the invention has been particularly shown and described with reference to preferred embodiments thereof, it will be understood by those skilled in the art that various other changes in the form and details may be made therein without departing from the spirit and scope of the invention.

What is claimed is:

1. A method for automatically processing in a computing system fees due from transactions in electronic commerce, each transaction formed of a first phase and at least a second phase, the first phase defining a first event location and a second event location and the at least second phase defining the second event location and a third event location, said method comprising the computer implemented steps of:

building a transaction information database with transaction event objects based on the first phase and the at least second phase in each transaction;

retrieving fee rules from a fee rule database;

determining if the fee rule applies to information in each of the first phase and the last least second phase of the transaction event object;

calculating the fees due based on the fee rule and the information in each of the first phase and the at least second phase of the transaction event object.

2. The method of claim 1 wherein said fee rules are general fee rules and specific fee rules and said method further comprises the computer implemented steps of:

applying the general fee rules to information in a transaction event object and said calculating step calculating a general fee based on the general fee rule and the information in the transaction event object;

applying the specific fee rules to information in a transaction event object and said calculating step calculating a specific fee based on the specific fee rule and the information in the transaction event object.

3. The method of claim 1 wherein the fee rules are tax rules based on tax laws in multiple government jurisdictions.

4. The method of claim 1 wherein said determining step comprises the computer implemented steps of:

getting the event locations of the transaction event object;

applying jurisdiction of the fee rule against the event locations of the transaction event object; and said calculating step calculating the fee if the jurisdiction matches the event location.

5. The method of claim 4 wherein said determining step further comprises the computer implemented steps of:

retrieving fee rule conditions in addition to jurisdiction;

testing the fee rule conditions against information in the transaction event object to decide if the fee rule applies; and said calculating step calculating the fee if both the jurisdiction and the fee rule conditions apply to the transaction event object.

6. The method of claim 5 further comprising the computer implemented steps of:

determining if a fee that is applicable to a transaction event object, has already been calculated when processing a previous transaction event object in same transaction in order to not duplicate fees for the same transaction.

7. Apparatus for processing fees due in multiple phases of a transaction in electronic commerce, the multiple phases formed of a first phase and at least a second phase, the first phase defining a first event location and a second event location and the at least second phase defining the second event location and a third event location, the computing system having a processor, an input/output device, and a data storage device, said apparatus comprising:

a collecting module for building a transaction information database from transaction information by creating transaction phase objects containing transaction information about the phases of the multiple phases of the transaction;

a calculation module for applying fee rules from a rule database to transaction phase objects, computing fees due at each phase of the transaction, and creating fee objects containing fee payment information based on the phases of the transaction and identifying the fee recipient entity; and a payment module for retrieving fee objects and making payments to fee recipient entities identified by the fee objects.

8. The apparatus of claim 7 wherein said rule database is a tax rule database and said calculating module comprises:

a jurisdiction module for determining from a transaction phase object if a phase of the transaction occurs in the jurisdiction of a tax rule from the tax rule database;

a tax module for applying the tax rule to the phase of the transaction to compute a tax fee due and creating a tax fee object including the tax fee due and the identity of a payee for the jurisdiction.

9. The apparatus of claim 8 further comprising:

a specific tax module for applying a specific tax rule to the phase of the transaction to compute a specific tax fee due based on information in the transaction phase object and creating a specific tax fee object including the specific tax fee due and the identity of a payee.

10. The apparatus of claim 8 further comprising:

a tax paid module for detecting when a tax rule has already been applied by said tax module to another phase of the transaction in order to prevent creation of duplicate tax fee objects for the transaction.

11. The apparatus of claim 8 wherein said payment module comprises:

a total module for accumulating all tax fees due to a payee;

a disbursement module for determining the optimum method of payment and executing payment to the payee.

12. The apparatus of claim 8 wherein said transaction phase objects are transaction information data objects about multiple phases of the transaction comprising such transaction phases as a purchasing phase, an order-communication phase, and a shipping phase.

13. A computer program for executing a computer process, said computer program being storage medium readable by a computing system and encoding a program of instructions for processing transaction information objects derived from electronic commerce, said computer process comprising the steps of:

collecting transaction objects based on each transaction, each transaction formed of a first phase and at least a second phase, the first phase defining a first event location and a second event location, and the at least second phase defining the second event location and a third event location;

determining if a fee rule applies to information of any of the first phase and the at least second phase in a transaction object; and calculating a fee based on the fee rule and the information in the transaction object.

14. The computer program of claim 13 wherein said fee rule is a tax fee rule and said determining step in said computer process comprises the computer implemented steps of:

getting the event locations of each transaction from the transaction object;

applying jurisdiction of the tax fee rule against the event locations of the transaction event; and said calculating step calculating the tax fee if the jurisdiction matches the event locations.

15. The computer program of claim 13 wherein there are multiple tax rules including general tax rules and specific tax rules and said method further comprises the computer implemented steps of:

applying the general tax rules to information in a transaction object and said calculating step calculating a general fee based on a general tax rule and the information in the transaction object;

applying the specific tax rules to information in a transaction object and said calculating step calculating a specific fee based on a specific fee rule and the information in the transaction object.

16. The method of claim 13 wherein said fee rule is a contractual fee rule and said determining step in said computer process comprises the computer implemented steps of:

retrieving fee rule conditions in the contractual fee rule;

testing the fee rule conditions against information in the transaction object to decide if the contractual fee rule applies; and said calculating step calculating the fee if the fee rule conditions apply to the transaction object.

17. The method of claim 13 further comprising the computer implemented steps of:

detecting if a fee in process that is applicable to a transaction object for a transaction, has already been calculated when processing a previous transaction object collected from the transaction; and getting a next fee rule or a next transaction object if said detecting step detects a fee in process has already been calculated.

18. A computer program product comprising:

a computer usable medium having a computer readable program code means embodied therein for causing a computer to process fees due in multiple phases of a transaction in electronic commerce, the multiple phases formed of a first phase and at least a second phase, the first phase defining a first event location and a second event location and the at least second phase defining the second event location and a third event location, the computer readable program code means comprising:

means for building a transaction information database from transaction information by creating transaction objects containing transaction information about the phases of the multiple phases of the transaction;

fee application means for applying fee rules from a rule database to transaction objects, computing fees due at each phase of the transaction, and creating fee objects containing fee payment information based on the phases of the transaction and identifying a fee recipient entity; and fee payment means for making payments to the fee recipient entities on the fee payments in the fee objects.

19. The computer program product of claim 18 wherein said transaction objects are transaction information data objects about multiple phases of the transaction comprising such transaction phases as a purchasing phase, an order-communication phase, and a delivery phase.

20. The computer program product of claim 18 wherein said rule database is a tax rule database containing tax rule objects and said fee application means in the computer readable program code means comprises:

means for determining from a transaction object if a phase of the transaction occurs in the jurisdiction of a tax rule from the tax rule database;

tax means for applying the tax rule to the phase of the transaction to compute a tax fee due and creating a tax fee object including the tax fee due and the identity of a payee for the jurisdiction.

21. The computer program product of claim 20 wherein the computer readable program code means further comprises:

a special tax means for applying a specific tax rule to the transaction to compute a specific tax fee due based on information in the transaction object and creating a specific tax fee object including the specific tax fee due and the identity of a payee.

22. The computer program product of claim 20 wherein the computer readable program code means further comprises:

means for detecting when a tax rule has already been applied by said tax means to the transaction in order to prevent creation of duplicate tax fee objects for the transaction.

23. The apparatus of claim 20 wherein said fee payment means in the computer readable program code means further comprises:

means for accumulating all tax fees due to a payee;

means for disbursing the tax fees due to the payee.

* * * * *